Jan. 15, 1929.  1,698,868

W. B. WOLFF

SLICING MACHINE

Filed March 10, 1928     4 Sheets-Sheet 1

Inventor
Wallace B. Wolff
by Parker & Carter
Attorneys.

Jan. 15, 1929.  W. B. WOLFF  1,698,868
SLICING MACHINE
Filed March 10, 1928    4 Sheets-Sheet 2
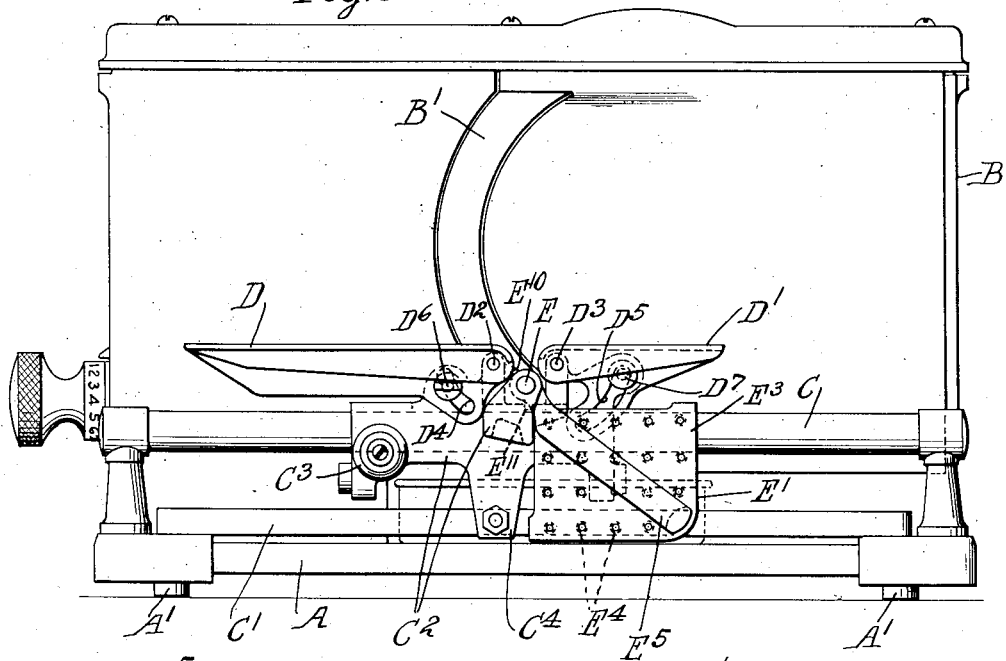
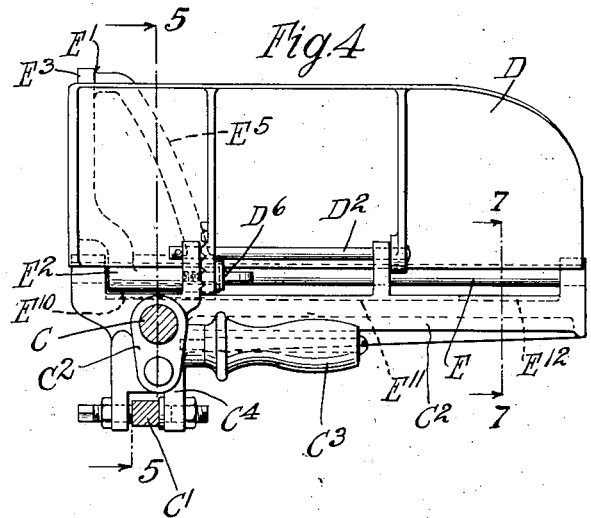
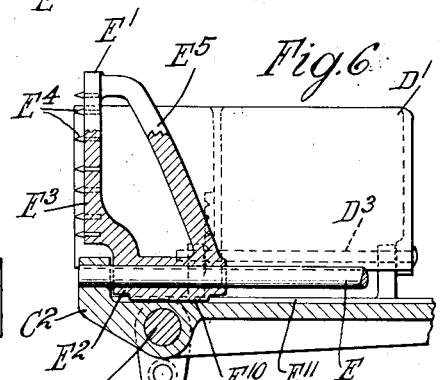
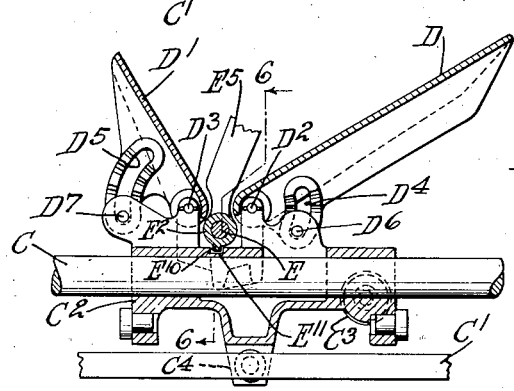
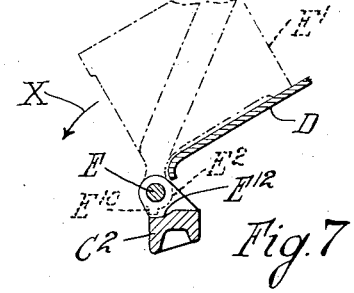
Inventor
Wallace B. Wolff
by Parker + Carter
Attorneys.

Jan. 15, 1929.  W. B. WOLFF  1,698,868
SLICING MACHINE
Filed March 10, 1928     4 Sheets-Sheet 3
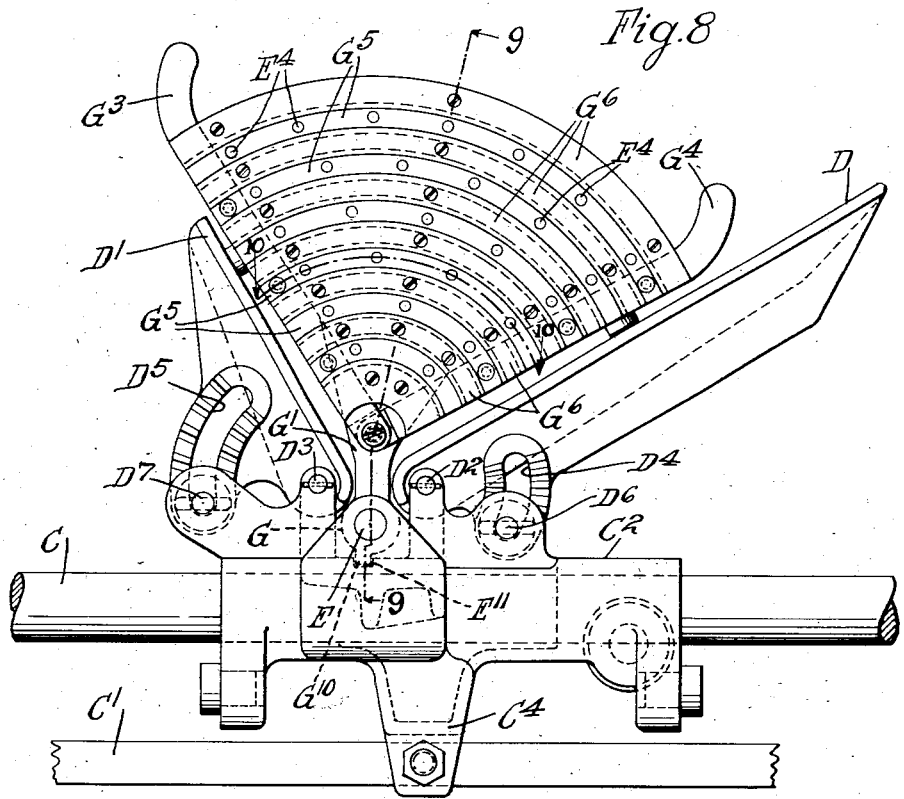
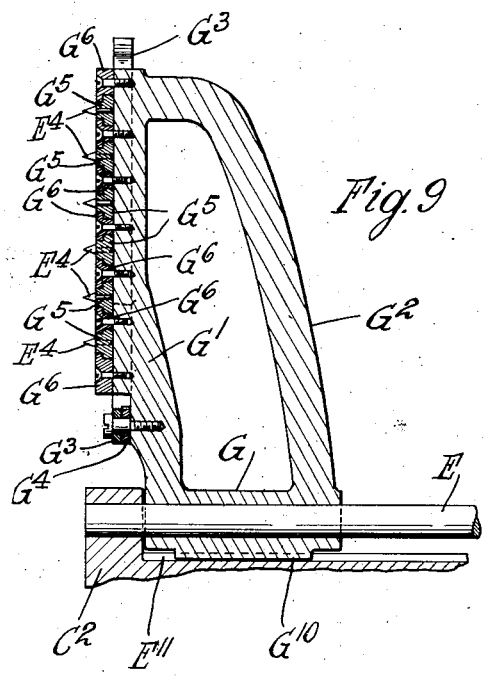
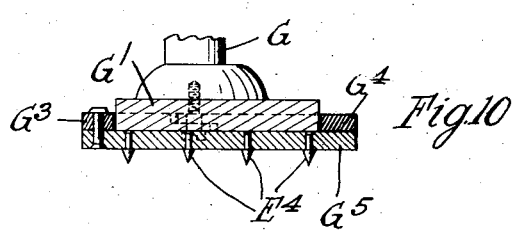
Inventor
Wallace B. Wolff
by Parker & Carter
Attorneys.

Jan. 15, 1929.

W. B. WOLFF 1,698,868

SLICING MACHINE

Filed March 10, 1928    4 Sheets-Sheet 4

Inventor
Wallace B. Wolff
by Parker & Carter
Attorneys.

Patented Jan. 15, 1929.

1,698,868

UNITED STATES PATENT OFFICE.

WALLACE B. WOLFF, OF CHICAGO, ILLINOIS, ASSIGNOR TO AMERICAN SLICING MACHINE COMPANY, OF CHICAGO, ILLINOIS, A CORPORATION OF NEW YORK.

SLICING MACHINE.

Application filed March 10, 1928. Serial No. 260,586.

My invention relates to a slicing machine and has for particular purpose the provision of a work supporting carriage for use with a rotary knife slicing machine, which carriage shall be adjustable for pieces of meat, bread and the like of varying size and form. Another object is the provision of a carriage with a plane horizontal supporting surface upon which large pieces of meat, bread and the like may be positioned, for example when it is desired to remove the crust of a large loaf of bread or to trim the rind from a piece of bacon. Another object is the provision of a pusher plate for employment with the carriage of the type above described. Another object is the provision of a laterally extensible pusher plate adapted to conform to different angular adjustments of the supporting members upon the carriage. Other objects will appear from time to time in the course of the specification and claims.

I illustrate my invention more or less diagrammatically in the accompanying drawings, wherein—

Figure 3 is a side elevation similar to Figure 1 with the parts in different position;

Figure 4 is a section on the line 4—4 of Figure 1;

Figure 5 is a section on the line 5—5 of Figure 4;

Figure 6 is a section on the line 6—6 of Figure 5;

Figure 7 is a section on the line 7—7 of Figure 4;

Figure 8 is a partial side elevation of a variant form of my device;

Figure 9 is a section on the line 9—9 of Figure 8;

Figure 10 is a section on the line 10—10 of Figure 8; and

Like parts are indicated by like symbols throughout the specification and drawings.

Referring first to the form of Figures 1 to 7 inclusive A indicates any suitable base member having ground engaging studs $A^1$. B generally indicates the slicing machine housing with the rotary knife exposed as at $B^1$.

C indicates any suitable horizontal supporting track and $C^1$ the guide track along which moves the carriage generally indicated as $C^2$ with its handle $C^3$ and its downward extension $C^4$ which engages the lower track $C^1$ and thereby prevents rotation of the carriage about the main supporting track C.

Figure 1:
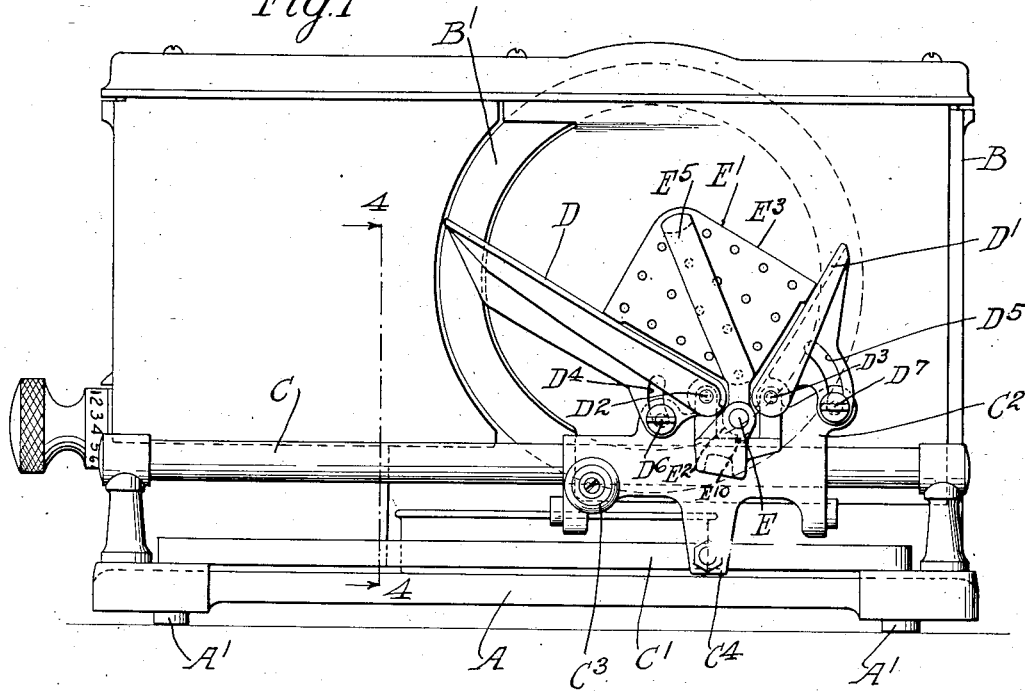
Figure 1 is a side elevation of my device.

Pivoted upon the carriage $C^2$ are the two work engaging and supporting members D $D^1$ pivoted respectively as at $D^2$ $D^3$ and provided with arcuate adjusting slots $D^4$ $D^5$ through which pass any suitable locking members $D^6$ $D^7$. It will be understood that the members D $D^1$ may be adjusted at any desired position but I preferably so form and proportion the slots $D^4$ $D^5$ that at the uppermost position the members D $D^1$ are generally at right angles to each other as shown in Figure 1. When at their lowest position they preferably lie in a single and generally horizontal plane as shown in Figure 3.

Mounted upon the carriage $C^2$ is a guide rod E upon which is rotatably and slidably mounted a pusher plate generally shown as $E^1$ with the hub $E^2$, the pusher plate proper $E^3$ with the working engaging points or studs $E^4$. $E^5$ indicates any suitable handle whereby the plate may be moved along the guide rod E.

When the members D $D^1$ are in the position in which they are shown in Figure 1 the pusher plate $E^3$ fills the space between them as shown in Figure 1. When it is desired to withdraw the pusher plate it may be moved to the rear along the rod E until it is beyond the outer end of the member $D^1$, at which time it may be swung out of alignment with the space defined by the members D $D^1$, as shown for example in Figure 3. The pusher plate may be employed with the members D $D^1$ set at different angular relationships than shown in Figure 1.

In order to prevent rotation of the end plate $E^3$ and the hub $E^2$ about the shaft E I provide on the hub $E^2$ a rib $E^{10}$. When the end plate is in the position shown in Figure 1 this rib $E^{10}$ seats in a groove $E^{11}$ formed in the top of the carriage. In order to permit rotation of the pusher plate $E^1$, when it is beyond the outer end of the member $D^1$, the top of the carriage is cut away as at $E^{12}$, to clear the rib $E^{10}$, as shown in Figure 7. At this position the rib $E^{10}$ is out of engagement with the groove $E^{11}$ and the pusher plate may be swung out of alignment as indicated by the arrow X in Figure 7.

Referring now to the variant form of Figures 8 and following I illustrate a pusher plate including the hub member G and its upward extension $G^1$ with which is associated the handle $G^2$. Concentrically pivoted to the extension $G^1$ are two bars $G^3$ $G^4$, these bars being pivoted for rotation about a center lying between and slightly above the centers of rotation of the members D $D^1$. Secured to each bar are a plurality of arcuate slide members $G^5$ and secured by any suitable manner to the upward extension $G^1$ of the pusher plate are a plurality of corresponding arcuate members $G^6$, the members $G^5$ $G^6$ interlocking as shown in Figure 9.

Figure 11:
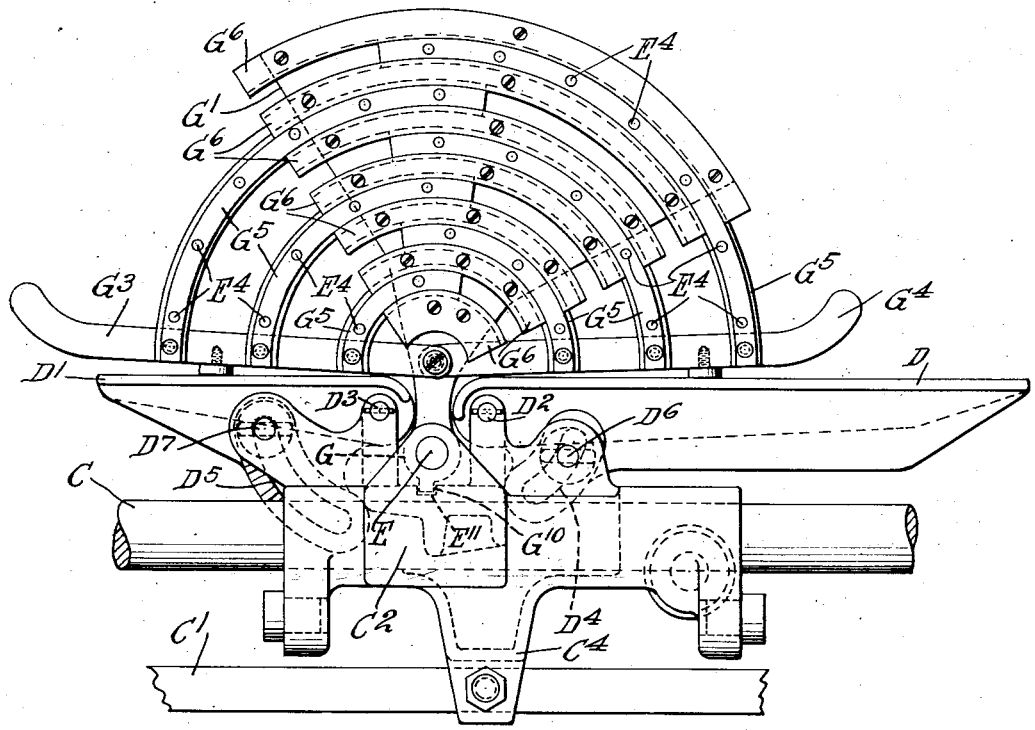
Figure 11 is a view similar to Figure 8 with the parts in different position.

It will be understood, from Figures 8 and 11 that I thereby provide a laterally extensible pusher plate which conforms to the space or arc defined by the members D and $D^1$ throughout their range of adjustment. The hub G is provided with a rib $G^{10}$ adapted to engage the groove $E^{11}$ the purpose of which is to prevent rotary movement of the pusher plate proper about the shaft E.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

In the employment of the type of slicing machines herein shown it is often desirable to slice large pieces of meat or to cut the rind from a large slab of bacon, or to cut the crust from a large loaf, for example a loaf of rectangular cross-section. It is impossible to do this with a slicing machine in which the carriage is shaped to provide a trough, as is frequently the case among slicing machines now on the market. However a trough shaped carriage is highly desirable for smaller pieces of meat and the like, since the meat is confined between the opposed sides of the trough and is firmly held. I obtain the advantages of both types of slicing machine since I provide a carriage having angularly adjustable sides. However a pusher plate which is satisfactory for use with a trough-shaped carriage may be unsatisfactory for use with a carriage having a plane extended top. I therefore employ a pusher plate, as in Figures 1 and following, which may be swung out of alignment altogether, about the pin E.

Figure 2:
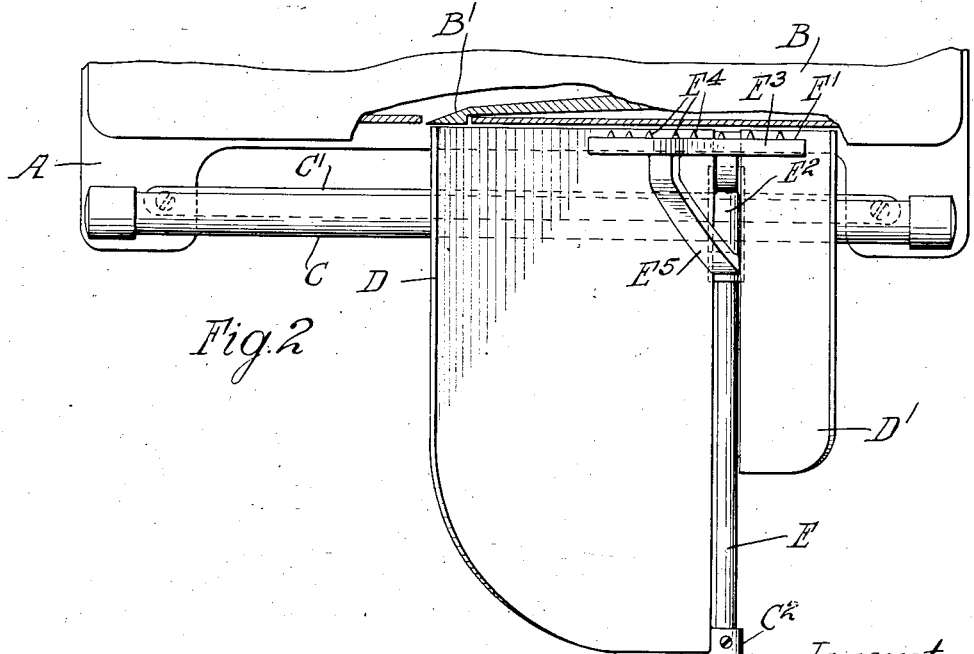
Figure 2 is a plan view of the structure shown in Figure 1 with parts in horizontal section.

In the form of Figure 1 the pusher plate $E^1$ is guided and held in upright position, as shown, by the rib $E^{10}$ seating in the slot $E^{11}$. In the form of Figures 8 and following similar means are employed for holding the part $G^1$ in upright position, namely the rib $G^{10}$ seating in the slot $E^{11}$. It will be understood that either form of pusher plate may be employed with members D and $D^1$ proportioned as shown in Figure 2 in order to permit the pusher plate to be swung out of alignment about the shaft E.

In the form of Figures 8 and following, regardless of the angle at which the adjustable sides D and $D^1$ are set, the face plate is able to adjust itself to the angle which is formed and may be employed even when the members D and $D^1$ are positioned in a single horizontal plane.

The variant form shown in Figures 8 and following illustrates a laterally extensible pusher plate in which two sets of interfitting arcuate slides are employed, whereby the pusher plate conforms to the arc defined by the supporting members at all ranges of their adjustment.

I claim:

1. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith and means for laterally extending said pusher plate to conform to variations in the angular relation of said supporting elements.

2. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith and guiding means therefor including a guide member on which said pusher plate is slidably and rotatably mounted.

3. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith, and means for adjusting the arc of said pusher plate to conform to variations in the angular relation of said supporting elements.

4. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith, said plate including a plurality of relatively movable members lying in substantially the same plane, and means for imparting relative movement thereto to conform to variations in the angular relation of the supporting elements.

5. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith, said plate including a plurality of relatively movable concentrically pivoted arcuate members and means for imparting relative movement thereto to conform to variations in the angular relation of the supporting elements.

6. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith, said plate including a plurality of relatively movable concentrically pivoted arcuate members and means for imparting relative movement thereto to conform to variations in the angular relation of the supporting elements, and a guide member on which the pusher plate assembly is slidably mounted.

7. The combination with a slicing machine having a rotary knife and means for actuating it, of a carriage and means for guiding said carriage across the face of said knife, said carriage including a plurality of supporting elements adapted to engage and support the work, means for varying the angular relation of said elements, a pusher plate associated therewith and a guide member upon which the plate is slidably mounted.

8. The combination with a slicing machine having a rotary knife and means for actuating it, of a carriage and means for guiding said carriage across the face of the knife and a laterally extensible pusher plate associated with said carriage.

9. The combination with a slicing machine having a rotary knife and means for actuating it, of a carriage and means for guiding said carriage across the face of the knife and a laterally extensible pusher plate associated with said carriage, and a guide member on said carriage, upon which said pusher plate is slidably mounted.

10. The combination with a slicing machine having a rotary knife and means for actuating it, of a carriage and means for guiding said carriage across the face of the knife and a laterally extensible pusher plate associated with said carriage, said pusher plate including a plurality of concentric arcuate sections lying in substantially the same plane and slidable in relation to each other.

11. The combination with a slicing machine having a rotary knife and means for actuating it, of a carriage and means for guiding said carriage across the face of said knife, said carriage including a plurality of supporting elements adapted to engage and support the work, pivotally mounted upon said carriage, a pusher plate upon said carriage and means for laterally extending said pusher plate to conform to variations in the angular relation of said supporting elements.

12. The combination with a slicing machine having a rotary knife and means for actuating it, of a carriage and means for guiding said carriage across the face of said knife, said carriage including a plurality of supporting elements adapted to engage and support the work, pivotally mounted upon said carriage, a pusher plate upon said carriage and means for laterally extending said pusher plate to conform to variations in the angular relation of said supporting elements, and guiding means for the pusher plate assembly, including a rod upon which it is slidably mounted, said rod being parallel with and positioned between the axes of rotation of the supporting elements.

13. The combination with a slicing machine having a rotary knife and means for actuating it, of a carriage and means for guiding said carriage across the face of the knife and a laterally extensible pusher plate associated with said carriage, said pusher plate including a plurality of relatively movable members, lying in substantially the same plane.

14. The combination with a slicing machine having a rotary knife and means for actuating it, of a carriage and means for guiding said carriage across the face of the knife and a laterally extensible pusher plate associated with said carriage, said pusher plate including a plurality of concentric arcuate relatively movable members.

15. The combination with a slicing machine having a rotary knife and means for actuating it, of a carriage and means for guiding said carriage across the face of said knife, said carriage including a plurality of supporting elements adapted to engage and support the work, pivotally mounted upon said carriage, a pusher plate upon said carriage and means for laterally extending said pusher plate to conform to variations in the angular relation of said supporting elements, including a plurality of concentric arcuate members movable about a center adjacent and between the axes of rotation of the supporting elements.

Signed at Chicago, county of Cook and State of Illinois, this 2nd day of March, 1928.

WALLACE B. WOLFF.